United States Patent [19]

Bedard et al.

[11] 4,345,200

[45] Aug. 17, 1982

[54] LOAD OUTPUT LEVEL CONTROL CIRCUIT

[75] Inventors: James F. Bedard; Charles W. Eichelberger, both of Schenectady; Salvatore F. Nati, Jr., Syracuse, all of N.Y.

[73] Assignee: General Electric Company, New York, N.Y.

[21] Appl. No.: 242,782

[22] Filed: Mar. 11, 1981

[51] Int. Cl.³ .............................................. G05B 24/02
[52] U.S. Cl. ................................... 323/350; 323/269; 323/284; 323/316
[58] Field of Search ........ 323/269, 274, 284, 315–317, 323/349–351; 315/DIG. 4, DIG. 7

[56] References Cited

U.S. PATENT DOCUMENTS 3,344,339 9/1967 Baude .................................... 323/350
3,416,066 12/1968 Bourreau et al. ..................... 323/350
3,956,645 5/1976 Boer ................................. 323/315 X
4,104,575 8/1978 Bauer .............................. 323/349 X Primary Examiner—William M. Shoop
Assistant Examiner—Peter S. Wong
Attorney, Agent, or Firm—Walter C. Bernkopf

[57] ABSTRACT

A circuit, for controlling the output level of a load circuit connected thereto, has a single input for receiving a control signal to provide both a selectable level on/off output signal at a first output connected to an on/off terminal of the load circuit, and a pair of essentially equal control currents drawn in shunt from a pair of output terminals connected to load output-level-setting input terminals. The shunt control currents are provided by a current-mirror circuit having a pair of substantially identical current sinks, each responsive to an input signal applied thereto in parallel from the single control circuit input.

15 Claims, 3 Drawing Figures

LOAD OUTPUT LEVEL CONTROL CIRCUIT

BACKGROUND OF THE INVENTION

The present invention relates to circuits for controlling the output level of a load and, more particularly, to a novel load output level control circuit having a single input for receiving a control signal for providing both on/off and output level information to a controllable load.

The ability to control the output level of a load facilitates many economic advantages in this day and age of energy conservation. With the advent of variable load-output level controls, such as are found in the variable-output gas-discharge lamp/ballast system of copending U.S. Patent application Ser. No. 177,942, filed Aug. 14, 1980, to the assignee of the present invention and incorporated herein by reference, control of fluorescent lamp light output is now practical. Such a lamp-ballast load requires both an on/off input and an output-level-setting input for proper control. Variable impedances may be utilized for on/off and level-setting control; however, greatest acceptance of such variable output level control systems require that the control signal(s) be generated equally as well at a location adjacent to, or a location remote from, the location at which the load control circuit is positioned. Thus, greatest economy is provided if a single signal-carrying circuit is utilized between the input of a control circuit (itself providing both the on/off and level-setting signals to the ballast-/lamp load) and some remote location at which the control input signal is generated. Further, greatest cost advantage occurs if the on/off and output-level-setting signals are derivable from a single signal, whereby multiplexing techniques and apparatus are not required.

BRIEF SUMMARY OF THE INVENTION

In accordance with the invention, a control circuit provides essentially equal magnitudes of a pair of sink currents, to be drawn from an associated pair of load input terminals of a load having an output level controlled by the magnitude of current drawn from the input terminals thereof, and also provides an on/off signal having an "off" level present only when the magnitude of the load input terminal shunt currents are changed to that magnitude reducing the load output level to a predetermined minimum, and providing an "on" level at all other levels of load output. A current-mirror circuit is utilized to sink the essentially equal currents from the load input terminals, with both sections of the current mirror circuit receiving a single analog voltage signal from the control circuit input. The control circuit input also provides the same analog voltage to the on/off circuit portion, whereby a single analog voltage input signal provides both output level and on/off information.

Accordingly, it is an object of the present invention to provide a novel load output level control circuit utilizing a single input for control of both on/off and load output level functions.

This and other objects of the present invention will become apparent upon consideration of the following detailed description of the invention, when read in conjunction with the drawings.

DETAILED DESCRIPTION OF THE INVENTION

Figure 1:
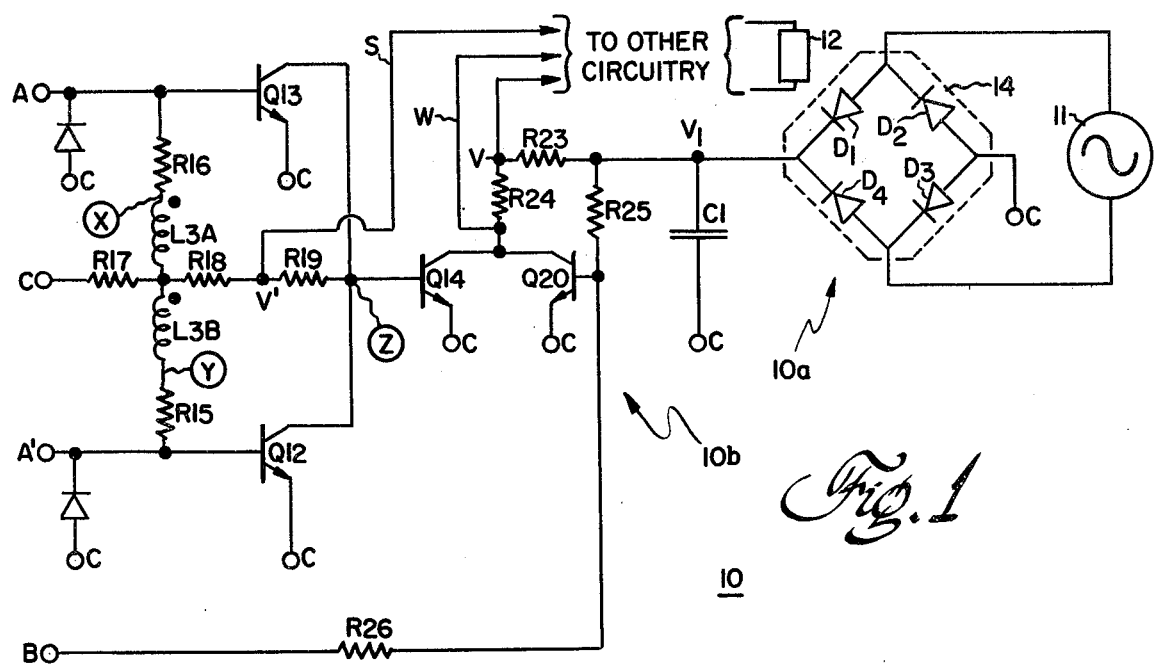
FIG. 1 is a schematic diagram of a portion of a ballast utilized for providing an adjustable light output level from a fluorescent lamp, and useful in understanding operation of the present invention.

Referring initially to FIG. 1, a load having a controllable output level is connected to an electrical energy source 11. The load is illustratively a ballast 10 and one or more gas discharge lamps, such as a fluorescent lamp 12. Ballast 10, of which only the power supply section 10a and control section 10b are shown, is configured to control the luminous output of fluorescent lamp 12 as a function of an externally-provided parameter, such as the magnitude of an impedance (electrical resistance) connected between control terminals A and A', and with the on-off function of the ballast-lamp combination being controlled by the impedance between an on-off terminal B and a ballast common line terminal C.

One method for providing a variable (dimmable) fluorescent lamp light level is described and claimed in co-pending application Ser. No. 177,835, filed Aug. 14, 1980, and one embodiment of an inverter-type ballast utilizing that method for fluorescent lamp light level control is described and claimed in co-pending application Ser. No. 177,942, both of which applications are assigned to the assignee of the present invention and are incorporated herein by reference in their entirety. Briefly, as described in the aforementioned patent applications, the AC energy source 11 is coupled to a bridge rectifier 14, comprised of diodes $D_1$–$D_4$, and a filter capacitor C1, which forms a power supply section 10a providing DC potential to the ballast, including a ballast di/dt control circuit section 10b and a ballast high-power inverter section (not shown) which is controlled by section 10b to provide relatively high-frequency energizing waveforms to fluorescent lamp 12. The level of light produced by fluorescent lamp 12 is a function of the frequency of the high-power inverter, which frequency is controlled by circuit section 10b. The control section 10b includes a di/dt sensor, or detector, consisting of transistors Q12 and Q13; resistors R15, R16, R17, R18, and R19; and dual transformer windings L3A and L3B. The di/dt-sensing control circuit has a threshold, or trip, point, which is the point at which the voltages at points X and Y drop to a low enough value to turn off both of transistors Q12 and Q13. Accordingly, the pair of transformer windings are wound upon a portion of the inverter transformer (not shown), such that if the voltage across transformer winding L3A is positive at the dotted end, a current will flow from point X, through resistor R16, and turn on transistor Q13, while the voltage across winding L3B is simultaneously positive at the dotted end, whereby transistor Q12 is turned off. Similarly, if the voltage across winding L3B is negative at the dotted end, a current will flow from point Y, through resistance R15, turning on transistor Q12, while the voltage across winding L3A is positive at the undotted end, applying a negative voltage to the base electrode of transistor Q13, which transistor is cutoff. As the windings L3A and L3B are of an equal number of turns, it will be appreciated that the voltages at points X and Y (obtained by coupling both windings to the same transformer core with substantially equal coupling coefficients) are substantially equal in magnitude but of opposite polarity, as indicated by the phasing dots. Thus, when the voltage at point X drops below a predetermined threshold value, transistor Q13, which was previously conducting, will turn off. At the same time, the voltage at point Y is equal in magnitude, but of opposite polarity, such that transistor Q12 is not conducting, whereby a node Z is at a voltage above common line C potential, since neither transistor Q12 nor transistor Q13 are conducting. As node Z is not at common line C potential, transistor Q14 is caused to conduct. This initiates a reversal of inverter load voltage, as described in more detail in the aforementioned patent applications. This load voltage reversal reverses the polarity of the voltages across windings L3A and L3B, whereby transistor Q12 is caused to conduct and turn off transistor Q14. The point X voltage changes until, at the preset threshold value, transistor Q12 turns off and again raises the voltage at node Z, again causing transistor Q14 to turn on to initiate reversal of the load voltage. The above-summarized action continues in cyclic fashion, with transistors Q12 and Q13 being alternately turned off when the absolute amplitude of the voltage at one of points X and Y reaches a preset threshold value. This preset threshold value is established by the turns ratio of windings L3A and L3B. Resistances R15 and R16, of substantially equal magnitude, are utilized to convert the voltages at points X and Y to currents for driving the base electrodes of respective transistors Q12 and Q13. The threshold value, at which the load voltage is switched (and which therefore establishes the light output of load 12) may be changed by reducing the currents flowing into the base electrodes of transistors Q12 and Q13 by equal amounts, as by common line C potential or the opposite transistor base electrode. Thus, connection of a resistance (not shown) between input terminals A and A' causes the instantaneous positive potential at one of terminals A or A' to be reduced, upon application of the associated winding voltage to the associated base electrode of respective transistors Q12 or Q13, via the voltage divider provided by resistances R15 and R16 and the resistance between terminals A and A'. The voltage divider action is further enhanced by the connection of the opposite and of the external resistance back to the instantaneous negative voltage at the remaining one of terminals A or A' respectively. By means of this voltage divider action, the voltage, across that one of windings L3A and L3B associated with the transistor to be turned on, is applied to the base electrodes with decreasing magnitude for decreasing magnitudes of the external resistance whereby a particular polarity of voltage is applied to the load for increasing shorter time intervals before load voltage switching occurs, thereby increasing the load driving frequency and reducing the light output from fluorescent light 12. If the resistance between terminals A and A' is substantially zero (a short-circuit) the voltages at the base electrode of both transistors Q12 and Q13 will be substantially zero, with respect to their emitter electrodes, since the voltages at points X and Y are always of substantially the same magnitude but of opposite polarity, and as resistances R15 and R16 are of substantially equal value. In this condition, transistors Q12 and Q13 are always cutoff and a maximum inverter frequency (minimum lamp output) condition occurs.

Conversely, if the resistance between input terminals A and A' is of a relatively high value, the transistor base electrodes will then be essentially isolated from one another and the respective transistors Q12 and Q13 will be alternately turned on with relatively low absolute voltage magnitudes across the associated one of windings L3A and L3B; this corresponds to a relatively low frequency of inverter operation whereby fluorescent light load 12 operates at substantial constant maximum power and produces a substantially constant maximum light output, as further described and claimed in U.S. Pat. No. 4,060,752 (wherein the base electrodes of the control transistors are in no way coupled to each other), which patent is assigned to the assignee of the present invention and incorporated in its entirety by reference hereto.

As previously described, the inverter portion of the ballast switches the voltage across load 12 responsive to transistor Q14 entering the cutoff condition. By paralleling transistor Q14 with another transistor Q20, inverter switching (and therefore the existence of a periodic waveform necessary to cause load power consumption) may be defeated if parallel transistor Q20 remains in the saturated condition, preventing the voltage at line W (the common collector connection between transistors Q14 and Q20) from rising. Thus, if the magnitude of a resistance R25 is chosen such that transistor Q20 normally receives sufficient base electrode current to remain in the saturating condition, the load 12 is turned off. If input terminal B, connected to the base electrode of transistor Q20, is connected to system common line C, the base electrode current of transistor Q20 is shunted to common and transistor Q20 is cutoff, allowing the load to be turned on and the light output thereof controlled by the resistance of element 20a between input terminals A and A'. Conversely, if input terminal B is disconnected (allowed to float) from the ballast common terminal C, or if a resistance R26 of sufficiently large magnitude is connected between input terminal B and the base electrode of transistor Q20, the transistor Q20 receives enough base electrode drive current to reenter saturation and turn off load 12. Thus, in addition to the variable resistance provided between input terminals A and A' to establish the level of load light output, switching of input terminal B between a relatively low and a relatively high resistance condition, to ballast common terminal C, is required.

Figure 2:
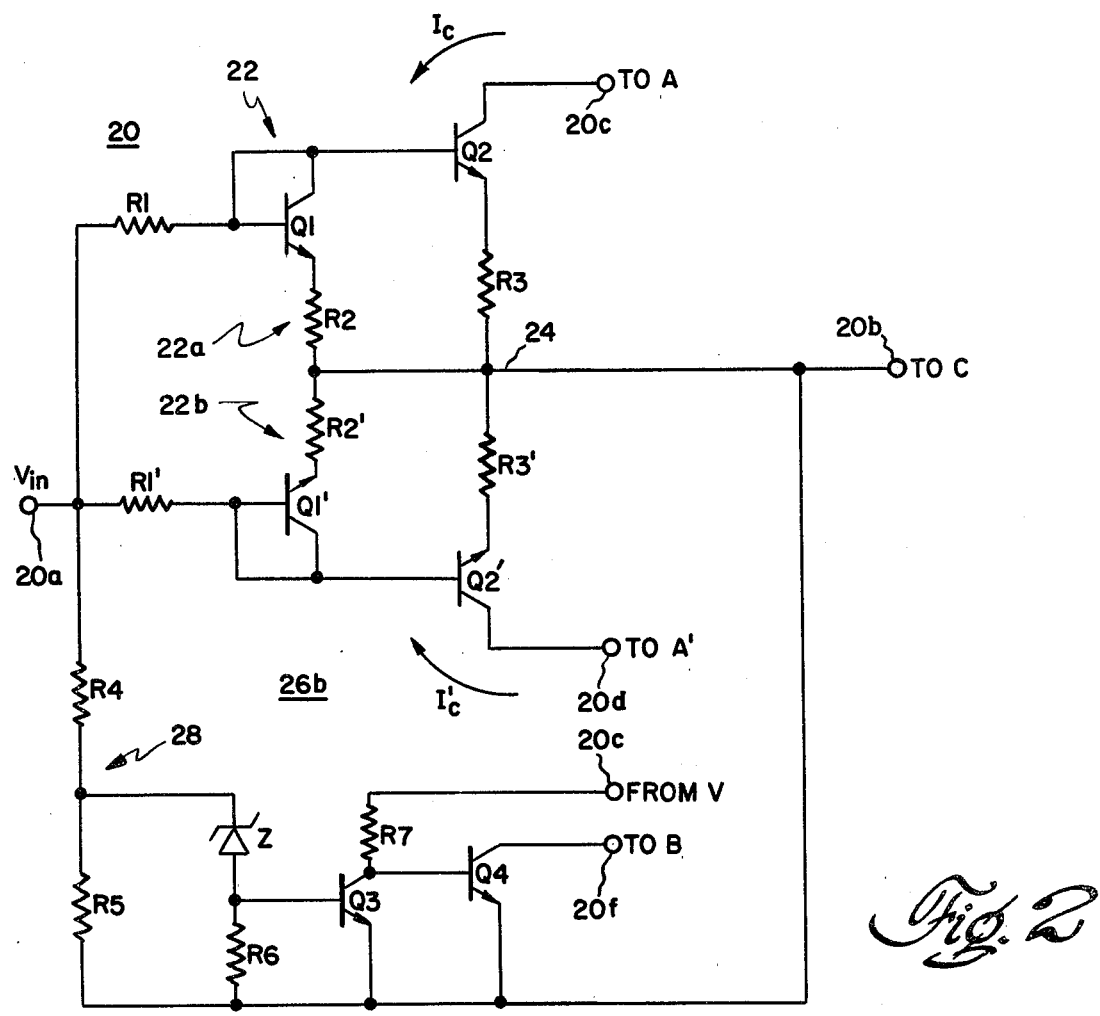
FIG. 2 is a schematic diagram of one presently preferred embodiment of a load control circuit utilizing a single input for control of both the on/off and load output level functions, in accordance with the present invention.

Referring to FIG. 2, a first preferred embodiment of a control circuit 20 utilizes a single analog D.C. control signal present at a single control circuit input 20a, and provides both an on/off output, to load on/off terminal B with respect to load common terminal C, and also simulates the effect of a variable resistance connected between load input terminals A and A' by sinking essentially identical shunt control currents $I_c$ and $I_c'$, respectively, from load output level control terminals A and A'. The load-level-setting shunt currents $I_c$ and $I_c'$ are provided by a current-mirror circuit portion 22, having a pair of "mirror-image" subcircuits 22a and 22b, each having an input resistance R1 or R1', of essentially equal resistance magnitudes, connected between control circuit common input 20a and the base electrode of each of first transistors Q1 or Q1'. The collector electrode of each of transistors Q1 or Q1' is connected to the base electrode of the same transistor, converting each of the transistors into a diode. The emitter electrode of each of transistors Q1 or Q1' is connected via an associated one of resistance R2 or R2', of essentially equal resistance magnitude, to a common line 24, itself connected to control circuit output terminal 20b (for connection to load common line terminal C). The base-collector connection of each of the first transistors is connected to the base electrode of an associated one of second transistors Q2 or Q2', each having its collector electrode connected to first and second output terminals 20c and 20d, respectively, for connection to load level-setting input terminal A and A'. The emitter electrode of each of transistors Q2 or Q2' is connected through an associated one of resistance R3 or R3' to common control circuit line 24; resistors R3 and R3' are of essentially equal resistance magnitude.

In operation, current mirror circuit portion 22 operates to shunt essentially equal magnitude control currents $I_c$ and $I_c'$ from load control input terminals A and A', with the magnitude of each of the shunting control currents $I_c$ and $I_c'$ being a function of ratio of the first transistor emitter resistance (R2 or R2') to the second transistor emitter resistance (R3 or R3') and to the ratio of the control circuit input voltage $V_{in}$ to the current mirror input resistance (R1 or R1'). Thus, if the base-emitter voltages of the first and second transistors (Q1 and Q2 or Q1' and Q2') are essentially equal and if the DC current gains (B) of the second transistors Q2 and Q2' are essentially equal (as may be provided by integrating all four transistor devices of the current mirror circuit in a single semiconductor chip with process steps simultaneously fabricating all of the devices) and if the resistance magnitude of each of first transistor emitter resistance R2 or R2' is much less than the resistance magnitude of the associated input resistance (R1 or R1'), then the shunt current magnitude $I_c$ or $I_c'$ is essentially given by $$I_c = I_c' = B(V_{in}/R1)/[(1+(1+B)(R3/R2))]$$

Further, if the six resistances of circuit portion 22 are also integrated upon the same substrate as the four transistors, known techniques may be utilized to set the magnitude of each pair of resistors (R1 and R1', R2 and R2', and R3 and R3') to be essentially equal and to track each other with changes in temperature and the like environmental conditions. Accordingly, it will be seen that equal amounts of current will be shunted from each of load-level-setting input terminals A and A', for a particular value of control circuit input voltage $V_{in}$, and that the essentially equal shunt currents will change proportional to the change in magnitude of the input voltage.

An on/off control section 26 utilizes an input voltage divider 28, comprised of resistances R4 and R5, connected between single input terminal 20a and common line 24. The voltage divider output, at the junction between resistances R4 and R5, is connected to the anode of a zener diode Z. The zener diode cathode is connected via another resistance R6 to control circuit common line 24, and to the base electrode of a transistor Q3. The collector electrode of transistor Q3 is connected to the base electrode of another base electrode Q4, and to one terminal of a load resistance R7. The emitter electrodes of both transistors Q3 and Q4 are connected to control circuit common line 24. The remaining terminal of load resistance R7 is connected to control circuit terminal 20e, for receiving a voltage V from the load power supply section 10a, e.g. at the junction of resistances R23 and R24. The collector of transistor Q4 is connected to control circuit output terminal 20f for connection to on/off control terminal B of the load.

In operation, if the control circuit input voltage $V_{in}$ is of about zero magnitude, with respect to control circuit common line 24, transistor Q3 receives substantially no base current and is in the cut-off condition. The value of resistance R7 is chosen to cause transistor Q4 to saturate when transistor Q3 is cut-off. Saturated transistor Q4 provides a relatively low resistance between control circuit output terminals 20b and 20f, respectively connected to load common terminal C and load on/off terminal 20b. The presence of a relatively low resistance between low terminals B and C removes load transistor Q20 from the saturated condition, placing the load in the "on" condition. With a substantially zero magnitude input voltage, the magnitude of each of shunt currents control current $I_c$ and $I_c'$ are essentially zero, whereby the load operates at maximum output level, e.g. maximum light output from lamp 12.

As the magnitude of input voltage $V_{in}$ is increased, the magnitudes of shunt control currents $I_c$ and $I_c'$ increase and reduce the load output level, e.g. the light output from lamp 12. Load output is continuously decreased until input voltage $V_{in}$ reaches a magnitude sufficient to cause the voltage at the output of voltage divider 28 to be equal to the sum of the zener diode voltage and the base-emitter voltage of transistor Q3. At this input voltage magnitude, current begins to flow through zener diode Z and the base-emitter junction of transistor Q3, removing transistor Q3 from saturation. Transistor Q3 now conducts enough collector current to remove transistor Q4 from saturation, whereby the resistance between control circuit output terminals 20b and 20f increases. A small additional increase in the input voltage $V_{in}$ causes the resistance provided by the collector-emitter circuit of transistor Q4 to become sufficiently high to cause load transistor Q20 to enter saturation, turning off the load (ballast 10 and, therefore, lamp 12). Until the "load off" level of the input voltage is reached, the increasing input voltage magnitude continues to cause current mirror section 22 to draw increasingly greater magnitudes of shunt control current from level-setting load input terminals A and A', whereby the load output level continually decreases, with the load being eventually turned to the "off" condition. It should be understood that, by proper choice of the values of on/off control portion components R4 and R5 and the zener voltage of diode Z, the load can be controlled to the "off" condition for an input signal magnitude slightly greater than the input signal magnitude set which the load output is decreased to a minimum (though not necessarily a zero) value. It should also be understood that the four resistances and/or the pair of transistors of on/off control section 26 may be integrated in the same, or a different, semiconductor substrate as the components of current-mirror section 22. Zener diode Z can, if the on/off control portion (or the entire control circuit) is integrated, be a reverse-biased base-emitter junction of a seventh integrated transistor.

It will also be seen that control circuit 20 allows a so-called "fail-soft" operation in case of control failure; loss of control signal $V_{in}$ causes transistor Q4 to saturate, turning the load to the "on" condition, while input currents to the current mirror circuit cease and essentially zero magnitude shunt control currents $I_c$ and $I_c'$ are provided to set the load to the maximum output level thereof.

Advantageously, the input voltage may be derived using isolation techniques, utilizing analog or digital signals, to provide a required degree of personnel and equipment safety. One method for deriving the input voltage from an analog signal is set forth hereinbelow; techniques and apparatus for deriving the input signal using pulse-width-modulated signals are described and claimed in copending U.S. application Ser. No. 242,783, filed Mar. 11, 1981, assigned to the assignee of the present application and incorporated herein by reference.

Figure 3:
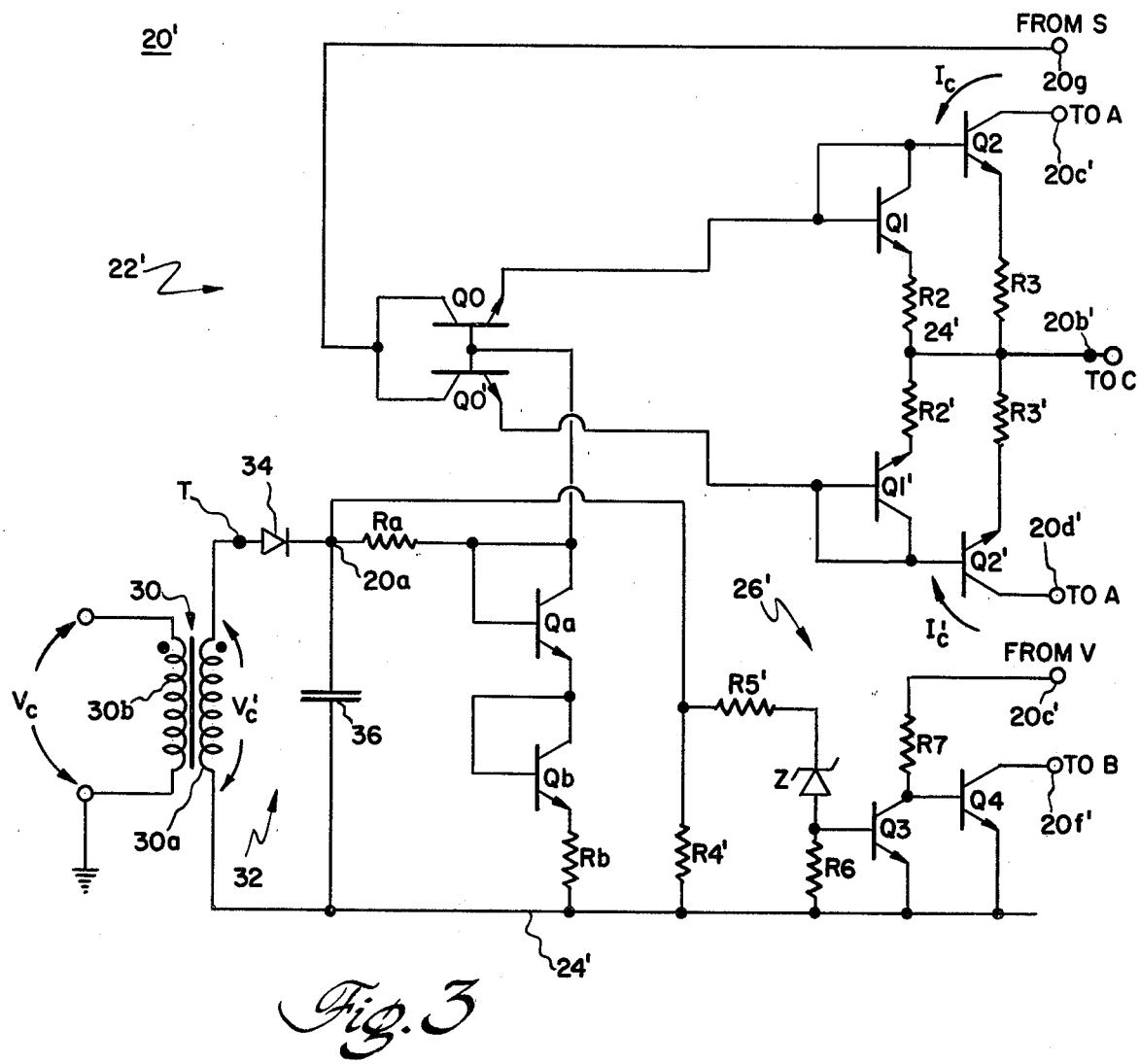
FIG. 3 is a schematic diagram of another presently preferred single-input load level control circuit.

Referring now to FIG. 3, another preferred embodiment of a single-input control circuit 20' is illustrated. In circuit 20' single control input 20a receives the DC voltage of a waveform appearing across the secondary winding 30a of an isolation transformer 30, having a primary winding 30b receiving a control voltage $V_c$, which may now be referenced to ground potential. The isolated secondary voltage $V_c'$ appears between a terminal T and common line 24'. As control voltage $V_c$ must be a periodic waveform to provide the transformed control voltage $V_c'$ across the transformer secondary winding, a half-wave rectifier 32 is utilized to provide a DC level to the input 20a, for the on/off control section 26 and the load level-setting section 22'. Rectifier means 32 includes a rectifier diode 34 having an anode connected to terminal T and a cathode collected to input 20a and to one terminal of a filter capacitor 36, having its remaining terminal connected to control section common line 24'. The rectifier output provides, at input 20a, a voltage across a resistance R4', which acts to discharge filter capacitance 36 at a time constant selected such that changes in the magnitude of the control voltage $V_c$ periodic waveform cause changes in the rectifier output voltage with a desired time constant. Voltage divider 28 (FIG. 2) is not utilized in this embodiment of on/off control section 26'. A series resistor R5' is connected between input 20a and the cathode of zener diode Z. Thus, for relatively small magnitudes of the control voltage $V_c$ periodic waveform, a relatively small DC voltage appears at input terminal 20a transistor Q3 is cut-off and transistor Q4 is saturated, turning the load to the "on" condition. As the magnitude of the periodic $V_c$ waveform is increased, the magnitude of the input 20a voltage is increased, until a level is reached at which the current flowing through the resistance R5' is sufficient to turn on transistor Q3, removing transistor Q4 from saturation and forming a sufficiently high resistance between control section output terminals 20b' and 20f' to place the load in the "off" condition.

The rectifier output (at input 20a) is also connected through a resistance Ra to the base-collector electrodes of a first diode-connected transistor Qa. The emitter electrode of transistor Qa is connected to the base-collector electrodes of a second diode-connected transistor Qb, having its emitter electrode connected through a resistance Rb to control section common line 24'. The junction between resistance Ra and transistor Qa is connected to the parallel-connected base electrodes of a pair of control transistors Q0 and Q0'. The collector electrodes of both transistors Q0 and Q0' is connected together to a control section terminal 20g, receiving operating potential from the load, e.g. at a line S at the junction between resistances R18 and R19 in load control section 10b. The respective emitter electrodes of control transistors Q0 and Q0' are each connected to the base electrode of an associated one of the current mirror section first transistors Q1 and Q1'. Transistors Q0 and Q0' operate as controlled resistances, connected between the voltage supplied at terminal 20g and the current-mirror section first transistor base electrodes. The currents provided from the emitters of transistors Q0 and Q0' are essentially equal; identical characteristics for these two transistors are facilitated by fabricating both transistors in the same semiconductor substrate. The emitter currents are proportional to the voltage at the base electrodes of transistors Q0 and Q0', which voltage is proportional to the voltage at rectifier output/circuit input 20a, due to the action of the voltage divider formed by resistances Ra and Rb, as temperature-compensated by the pair of diode-connected transistors Qa and Qb. Thus, in operation, as the rectifier output/circuit input voltage is raised, transistors Q0 and Q0' supply essentially equal increasing magnitudes of current to the current mirror-circuit, causing increasing, essentially-equal magnitude shunt control currents $I_c$ and $I_c'$ to be drawn from load input control terminals A and A'.

While several presently preferred embodiments of our novel load output level control circuit have been described herein, many modifications and variations will now become apparent to those skilled in the art. It is our intent, therefore, to be limited only by the scope of the appending claims and not by the specific details of the examples described herein.

What is claimed is:

1. A circuit for controlling the output level of a load having an on/off control terminal, a common terminal and a pair of output-level-setting terminals, comprising:
    a circuit common line adapted for connection to said load common terminal;
    a single input terminal receiving an analog voltage with respect to said common line;
    first means for providing to said on/off control terminal a signal having first and second output levels respectively responsive to said input analog voltage being respectively less than and greater than a predetermined magnitude respectively for controlling said load to the on and off conditions; and
    means connected between said single input terminal and said load output-level-setting terminals for sinking essentially equal amounts of current from each of said load output-level-setting terminals to establish the output level of said load, the magnitudes of said currents varying responsive to the magnitude of said input analog voltage.

2. The circuit as set forth in claim 1, wherein said current sinking means sinks increasingly greater amounts of current from said load output-level-setting terminals as the magnitude of said input terminal analog voltage increases.

3. The circuit as set forth in claim 2, wherein said currents have a minimum magnitude for an input signal of substantially zero magnitude.

4. The circuit of claim 3, wherein said currents have magnitudes selected to establish said load at a minimum output level, for an input signal magnitude less than said predetermined magnitude.

5. The circuit as set forth in claim 1, wherein said current sinking means comprises a current mirror circuit.

6. The circuit as set forth in claim 5, wherein said current mirror circuit includes a pair of output terminals each adapted for connection to one of said load output-level-setting terminals; and first and second substantially identical subcircuits each having an input connected to said circuit input terminal and an output connected to one of said circuit output terminals for sinking substantially identical magnitudes of current flow therefrom.

7. The circuit as set forth in claim 6, wherein each of said current sinking means subcircuits includes: a first transistor having the base and collector electrodes thereof connected together, and an emitter electrode; a first resistance element connected between said control circuit input terminal and the base-collector electrodes of first transistor; a second resistance element connected between said first transistor emitter electrode and said circuit common line; a second transistor having a base electrode connected to the base-collector electrodes of said first transistor, a collector electrode connected to an associated one of said current-sinking means output terminals, and an emitter electrode; and a third resistance element connected between said second transistor emitter electrode and said common line.

8. The circuit as set forth in claim 7, wherein the first and second transistors of each of said current sinking means first and second subcircuits have essentially equal base-emitter voltages and DC current gains.

9. The circuit as set forth in claim 8, wherein the second resistance elements of said current sinking means first and second subsections are of substantially lesser magnitude than the first resistance elements.

10. The circuit as set forth in claim 7, wherein said first resistance of each of said current sinking means first and second subsections is provided by the collector-emitter circuit resistance of one of a pair of control transistors; and further comprising a temperature-compensated voltage divider having an input receiving the single control input analog signal and an output connected to base electrodes of both control transistors.

11. The circuit as set forth in claim 10, wherein said temperature-compensating voltage divider comprises a resistance element in series between said circuit single input terminal and the paralleled base electrodes of said control transistors; another resistance element having a first terminal connected to said circuit common line and a remaining terminal; and first and second diode-connected transistors connected between the paralleled base electrodes of said pair of control transistors and the remaining terminal of said second resistance.

12. The circuit as set forth in claim 1, wherein said on/off signal providing means comprises: another output terminal adapted for connection to the on/off control terminal of said load; third and fourth transistors each having an emitter electrode thereof connected to said circuit common line; a source of operating potential; a resistance element having a first terminal connected to said potential source and a second terminal connected to the collector electrode of said third transistor and the base electrode of said fourth transistor; and a zener diode coupled between said circuit input terminal and said third transistor base electrode to establish the magnitude of circuit input terminal voltage at which said fourth transistor controls said load on/off terminal from the on condition to the off condition.

13. The circuit as set forth in claim 12, further comprising a current limiting resistance element in series between said input terminal and said zener diode.

14. The circuit as set forth in claim 1, wherein said input signal is a periodic waveform, and further comprising means coupled between said circuit input terminal and said circuit common line for DC isolating said input signal from said circuit; and means for recovering a DC voltage from said isolating means for application to said circuit single input terminal.

15. The circuit as set forth in claim 14, wherein said isolating means comprises a transformer having a primary winding receiving said input signal and a secondary winding across which an isolated representation of said input signal appears for coupling to said DC voltage recovering means.

* * * * *